F. E. SMALL.
PISTON PACKING.
APPLICATION FILED SEPT. 11, 1914.
1,129,910.
Patented Mar. 2, 1915.
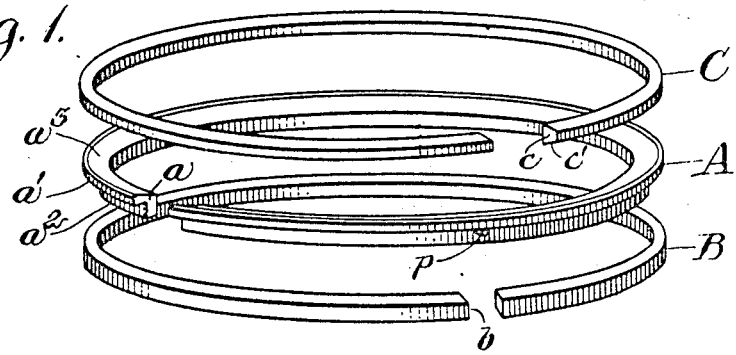
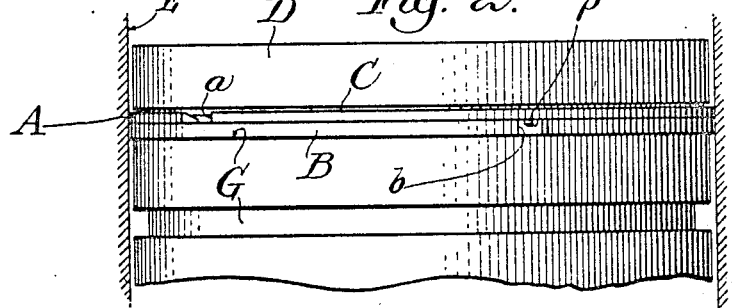
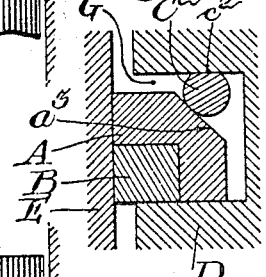
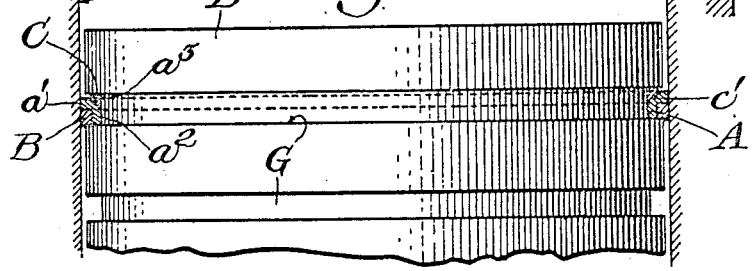
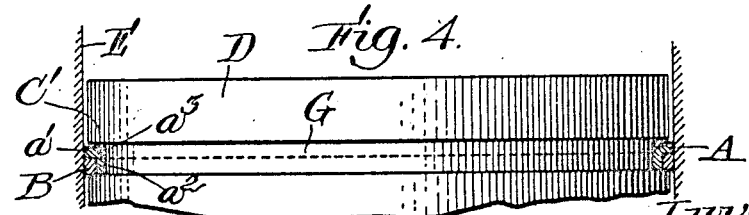

UNITED STATES PATENT OFFICE.

FREDERICK E. SMALL, OF NEEDHAM, MASSACHUSETTS.

PISTON-PACKING.

1,129,910.

Specification of Letters Patent.

Patented Mar. 2, 1915.

Application filed September 11, 1914. Serial No. 861,322.

*To all whom it may concern:*

Be it known that I, FREDERICK E. SMALL, a citizen of the United States, and resident of Needham, in the county of Norfolk and State of Massachusetts, have invented new and useful Improvements in Piston-Packing, of which the following is a specification.

This invention relates to piston packings and while adapted to the packing of pistons generally, it is especially designed for the packing of pistons of internal combustion engines. In such engines in operation the cylinder is cooled while the piston is hot, and the latter therefore expands more than the cylinder and must fit loosely within the cylinder to avoid binding. In order to maintain the high compression which is necessary, the packing must be tight not only between the packing and the cylinder but between the packing and the groove of the piston to prevent leakage underneath the piston rings.

The principal object of the present invention is to produce a novel and improved metallic piston packing which shall accomplish these results and which shall also be simple in construction and free from multiplicity of parts and complexity of construction.

In the accompanying drawings which illustrate an embodiment of the invention, Figure 1 is a perspective view of the three rings which constitute the packing; Fig. 2 is a side elevation of the packing rings in place on a piston head; Fig. 3 is a sectional view of said packing rings in place on the piston head; Fig. 4 is a view similar to Fig. 3, illustrating another form of the invention; and Fig. 5 is an enlarged detail view in cross section, illustrating a slight modification of the structure shown in Fig. 4.

Referring to the drawings, A represents one of the two packing rings. The ring A is divided at a single point $a$, but is otherwise continuous; and is resilient and normally tends to expand by its own resiliency. The spring ring A is L-shaped in cross section, and has the laterally extending flange $a'$ and longitudinally extending flange $a^2$. The end of the flange $a'$ is adapted to bear against the walls of the cylinder, and the end of the flange $a^2$ bears against one of the side walls of the groove in the piston. The ring A is also provided with the inwardly facing bevel surface $a^3$ at its outer angle. B represents the other packing ring, divided at a single point $b$. The packing ring B is also a spring ring tending to expand by its own resiliency, and is rectangular in cross section so as to fit exactly within the inner angle of the packing ring A. The position of the two rings when assembled is best shown in Figs. 3 and 4. The spring ring C is a forcing ring or follower ring divided at a single point $c$ and normally tending to expand by its own resiliency. In the forms shown in Figs. 1, 2 and 3 said forcing ring has an outwardly facing bevel surface $c'$, which bears against and coöperates with the bevel surface $a^3$ of the packing ring.

The three rings are assembled in the circumferential groove G of the piston head D in such position that the points of division $a$ and $b$ of the two packing rings break joint. The ring A is provided with a pin $p$ which projects into the opening $b$ of the ring B to hold the two rings in broken joint relation and prevent them from working into such position that the openings $a$ and $b$ will register. When assembled in the groove of the piston head as shown in Figs. 2 and 3, the natural resiliency of the packing rings A and B tends to expand the packing into close engagement with the inner wall of the cylinder E. The groove G is wider than the combined width of the packing rings A and B so that the packing rings will fit loosely in the groove and be free to expand or contract without any tendency to bind between the side walls of the groove. The forcing ring C, coöperating with the bevel surface $a^3$ of the packing ring A, by reason of its expansion makes a constant bearing engagement with the bevel surface $a^3$. One component of the force exerted against the surface $a^3$ tends to aid in the expansion of the packing rings A, B, and thereby to effect a tight closure between the peripheries of said rings and the cylinder wall E; while the other component of said force tends to thrust said packing rings bodily endwise with relation to the piston head D and thereby to hold the packing rings A, B, in tight engagement with one side of the groove G. Thus, the packing is maintained tight against loss of pressure both between the rings and the cylinder wall and underneath the rings between the rings and the piston head.

The combined width of the packing rings is substantially less than the width of the annular groove G in the piston, so that a clearance of substantial width is provided between one side of the packing rings and one side of the groove, as clearly shown in Figs. 2, 3 and 5. This enables the packing rings to be easily inserted into their grooves by first inserting one end of the ring into the groove, bending the ring slightly for that purpose and tipping the ring relatively to the axis of the piston, and then springing the rest of the ring into the groove by following around the ring until the whole is sprung into the groove. This is rendered possible by having the groove substantially wider than the rings, so that the groove will receive the rings when tipped or tilted to the axis of the piston. In the usual form of snap packing rings, the ring exactly fits and fills the groove, with the result that the ring cannot be inserted part at a time because the groove will not receive the ring when tilted, but must be sprung all at once over the piston, and snapped into the groove all at once. This tends either to stretch and distort the ring so that it will not make a good joint, or frequently to break the ring. The removal of such snap rings is attended with even greater difficulties, since there is not only the danger of distorting or breaking the ring, but it cannot be removed at all without inserting the usual expanding strips under the ring in the manner familiar to engineers. With the present invention there is comparatively little distortion of the rings and no danger of breaking them; and they can be readily inserted and removed without the aid of implements. Another advantage of making the groove wider than the rings is that a clear and free space is provided to admit steam behind the rings which aids in setting the packing by steam pressure.

In the forms shown in Figs. 4 and 5, the packing rings A, B, are of the same construction as already described. The spring follower ring C′ (Fig. 4) instead of having the cross sectional shape of the spring ring C, is substantially circular in cross section, its rounded surface bearing against the bevel surface $a^3$ of the packing ring A. The follower ring C′ in Fig. 4 is made of a round drawn steel wire, and is left rounded on all sides. In the form shown in Fig. 5 the follower ring $C^2$ is also made of a round drawn steel wire, ground flat on the side which bears against the side wall of groove G. An advantage of using a follower ring of the form shown in Figs. 4 or 5, is that the round surface which bears against the bevel surface $a^3$ accommodates itself to any angle or form of bevel and does not require the nice fitting necessary when a bevel follower ring of the form shown at C is used. Thus the rounded surface ring is cheaper to make and more certain and perfect in its action, especially if any irregularities are present in the bevel form of ring. The provision of the flat bearing surface $c^2$ (Fig. 5) possesses the further advantage that there is less likelihood of the ring wearing a groove in the side wall of the channel G, and less likelihood of the ring $C^2$ becoming wedged between the ring A and the wall of channel G in use.

I claim:

In combination, a piston having an annular groove therein, and a packing in said groove comprising a continuous resilient packing ring L-shaped in cross section and divided at a single point, said ring having a beveled surface at its outer angle, a second continuous resilient packing ring divided at a single point, filling the inner angle of said L-shaped ring and arranged to break joint therewith, the combined width of said rings being substantially less than the width of said groove, whereby a clearance is provided between the side of said packing rings and the side of said groove, and a spring follower ring engaging the beveled surface of said L-shaped packing ring and one wall of said groove, and adapted to urge said two packing rings in both a radial direction and an endwise direction on the piston against the opposite wall of said groove.

Signed by me at Boston, Massachusetts, this 3rd day of September 1914.

FREDERICK E. SMALL.

Witnesses:
RICHARD W. HALL,
ROBERT CUSHMAN.